May 31, 1949.    W. A. PULVER    2,471,894
AIRFOIL ICE REMOVER
Filed Feb. 3, 1947
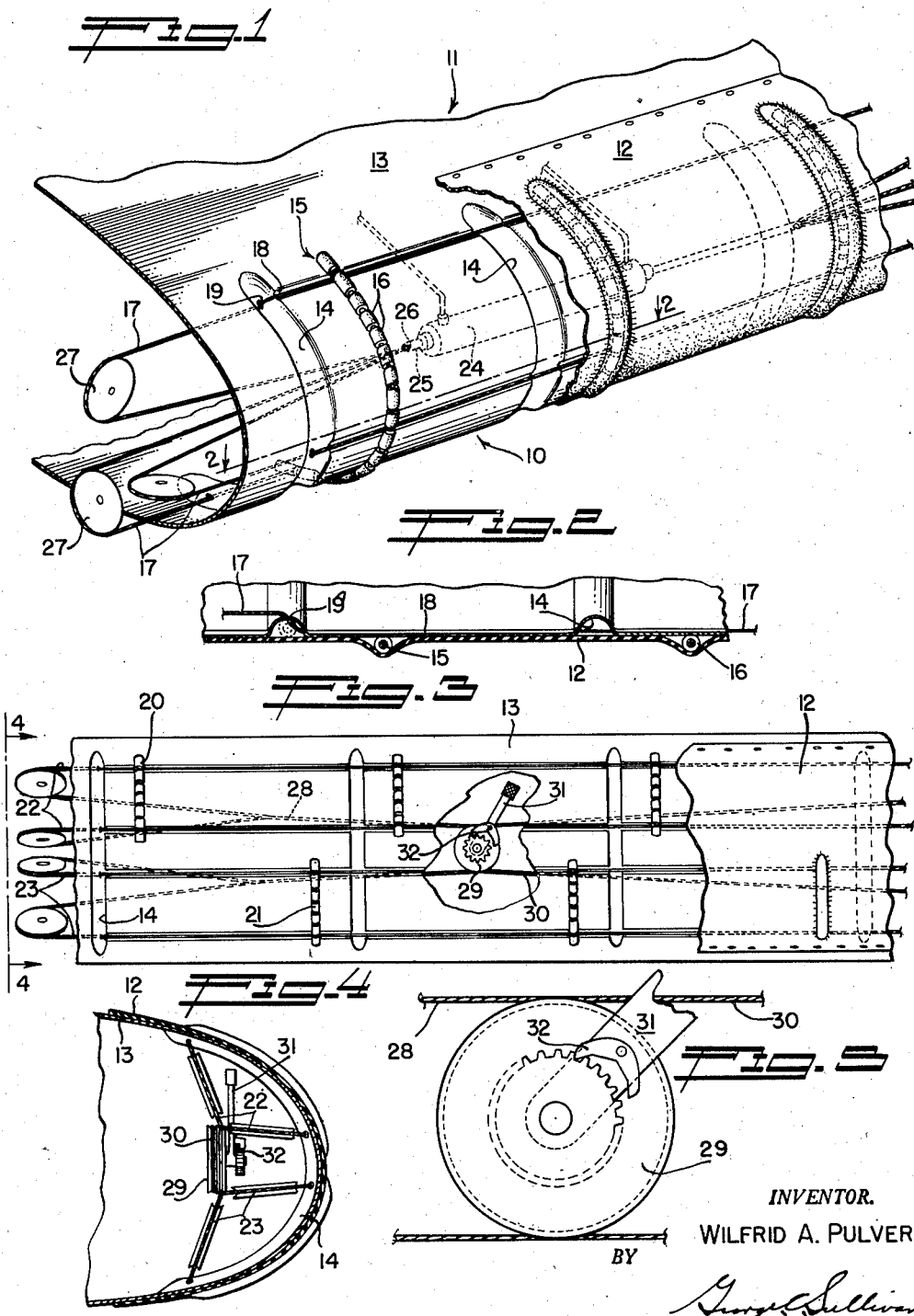
INVENTOR.
WILFRID A. PULVER
BY
Agent Patented May 31, 1949

2,471,894

UNITED STATES PATENT OFFICE 2,471,894

AIRFOIL ICE REMOVER

Wilfrid A. Pulver, Sherman Oaks, Calif., assignor to Lockheed Aircraft Corporation, Burbank, Calif.

Application February 3, 1947, Serial No. 725,998

2 Claims. (Cl. 244—134)

1

This invention relates to removing or breaking away the ice which may have formed on the leading edges of fixed or movable arifoils, such as propellers and the wing and tail surfaces of aircraft.

Aircraft anti-icing or "de-icing" arrangements now in use include internal heating of the leading edges of airfoils or inflatable rubber boots applied over the leading edges. Neither system is either structurally or economically practical for small and medium sized airplanes, as a wing heating system involves extensive ducting, heat exchangers, etc., while the inflatable boots now in commercial use are relatively expensive, troublesome and short lived, and affect the aerodynamic characteristics of the forward part of an airfoil when in use, to say nothing of the complicated pneumatic systems required for the operation thereof.

It is, accordingly, an object of this invention to provide a simple ice removal system that can be readily installed without complex pumping or heating arrangements with the attendant plumbing and ducting systems.

It is a further object of this invention to provide a system of the class described, light enough for installation in small airplanes and adaptable for actuation manually, hydraulically or electrically, depending on the size of the airplane, and/or the type of auxiliary power available therein.

Other objects and features of the invention will be readily understood from the following detailed description of the typical preferred forms of the invention wherein reference will be made to the accompanying drawings in which:

Figure 1 is a perspective view of an ice-removing mechanism embodying the preferred form of my invention as applied to the leading edge of a portion of a wing;

Fig. 2 is a fragmentary detailed section on the lines 2—2 of Figure 1;

Figure 3 is a side view of a slightly modified form of my invention;

Figure 4 is a vertical section on the line 4—4 of Figure 3; and

Figure 5 is a detail of the pawl and ratchet mechanism of Figure 4.

While my invention is applicable to airfoils generally, including propellers, wings and control surfaces, I have chosen to illustrate it as applied to the nose section 10 of an airplane wing 11, only a portion of which is illustrated in the drawings, it being understood that normally the entire leading edge would be equipped for ice removal.

2

A resilient and stretchable rubber-like sheet 12 is snugly fitted to the skin 13 of the nose section 10, and the edges thereof secured to the skin 13 in any suitable manner.

The skin 13 is provided with a number of skin beads or pockets 14 spaced along the leading edge or nose section at equal intervals determined by the intended range of movement or stroke of the sheet distorting member to be hereinafter described.

The beads or pockets 14 are of such depth as to receive a semi-rigid member 15 having a plurality of rollers 16 thereon, the member 15 conforming to the cross-sectional shape of the nose section, and having a slight set or spring to cause the member to hug the nose profile and fit into the beads 14. A plurality of cables 17 connect the several members 15, and shallow lengthwise depressions 18 are formed in the skin of the nose section to receive those cables connecting the several members 15 along the length of the wing, the cables being carried into the interior of the wing through apertures 19 in the innermost and outermost beads or pockets 14.

In the preferred form of the invention as shown in Figure 1, the members 15 are in one piece, while in the modification of Figure 3, two similar members 20 and 21 initially occupy the same bead or pocket and move in opposite directions when pairs of cables 22 and 23 are actuated.

The members 15, 20 and 21 may be operated manually, hydraulically or electrically, as dictated by the form of auxiliary power available in the airplane. In Figure 1, I have shown a double acting hydraulic cylinder 24, the piston rod 25 of which has eyes 26 on both ends to which the cables 17 are led over pulleys 27. With this arrangement, assuming that the several members 15 are in their left hand skin beads or pockets 14, energization of the hydraulic piston rod to the left will pull the outboard ends of the cables 17 to move the several members 15 to the right until each member drops into the skin bead 14 previously occupied by the preceding member 15. The members 15 can thus be intermittently reciprocated back and forth between adjacent skin beads 14, there being one more bead 14 than the number of members 15.

In the modification of Figure 3 the two reciprocating members 20 and 21 simultaneously move in opposite directions. I have shown a manual control for the operation thereof, it being understood that the hydraulic mechanism of Figure 1 is equally applicable to this version, and vice versa.

In this version the cables 22 at the inboard end are coupled to a single cable 28 operating in one groove of a double pulley 29, the cable 28 returning to the inboard end of the wing and being coupled to the inboard ends of the cables 23. Similarly, the outboard ends of the cables 22 and 23 are interconnected by a cable 30 engaging the second groove in the pulley 29. It will be evident from this arrangement that rotation of the pulley 29 will simultaneously pull the several members 20 in one direction while pulling the members 21 in the opposite direction. If this operation is to be done manually it would be convenient to locate the actuating mechanism adjacent the pilot's compartment, but for the sake of simplicity in illustration I have indicated the operating mechanism as applied directly to the pulley 29. A convenient arrangement would be to use a hand lever 31 operating a reversible pawl and ratchet mechanism 32 to pull the set of members 20 one way, while simultaneously pulling the other set of members 21 the other way until each member has been shifted from one skin bead 14 to the next.

It will thus be seen that I have invented an improved and simplified arrangement for mechanically loosening or removing ice from airfoil surfaces that is readily adaptable for manual or powered operation, and can be easily and economically installed in small or medium sized airplanes.

Having described only typical forms of the invention, I do not wish to be limited to the specific details herein set forth, but wish to reserve to myself any variations or modifications that may appear to those skilled in the art and/or fall within the scope of the following claims.

I claim as my invention:

1. In combination with an aircraft airfoil such as a wing, ice removing arrangements including a resilient cover overlying the normal surface of the curved leading edge portion of said airfoil, and means for distorting said cover to loosen ice formed thereon, comprising a resilient carrier member adapted to conform to the curve of the leading edge of the covered portion of said airfoil and substantially coextensive with the cover, the resilient carrier member lying in a plane generally perpendicular to, and extending fore and aft with respect to, the airfoil, means for reciprocating said carrier member spanwise of said airfoil and beneath the cover overlying the same, a series of rollers mounted on said carrier member and adapted to ride on the surface of said airfoil to progressively distort said cover as the carrier member is moved spanwise of the airfoil, the covered portion of said airfoil having a chordwise recess formed therein adapted to receive said carrier member and the rollers mounted therein in the initial or inactive position of said carrier.

2. In combination with an aircraft airfoil such as a wing, ice removing arrangements including a resilient cover overlying the normal surface of the portion of said airfoil, and means for distorting said cover to loosen ice formed thereon, comprising a series of spaced resilient carrier members disposed along the span of the airfoil each adapted to conform to the adjacent chordwise curve of the covered portion of said airfoil and substantially coextensive with the covered surface chordwise thereof, means for simultaneously reciprocating said carrier members through a distance spanwise of said airfoil corresponding to the spacing of said members, and a series of rollers mounted on said carrier members and adapted to ride on the surface of said airfoil beneath said cover whereby to progressively and simultaneously distort said cover as the carrier members are moved spanwise of the airfoil.

WILFRID A. PULVER.

REFERENCES CITED

The following references are of record in the file of this patent:

UNITED STATES PATENTS

| Number | Name | Date |
| --- | --- | --- |
| 2,201,155 | Burgess | May 21, 1940 |
| 2,297,951 | Frank | Oct. 6, 1942 |

FOREIGN PATENTS

| Number | Country | Date |
| --- | --- | --- |
| 832,205 | France | June 27, 1938 |